United States Patent [19]
Murata

[11] Patent Number: 5,418,847
[45] Date of Patent: May 23, 1995

[54] COMMUNICATION TERMINAL APPARATUS

[75] Inventor: Yukio Murata, Yokohama, Japan

[73] Assignee: Canon Kabushiki Kaisha, Tokyo, Japan

[21] Appl. No.: 302,375

[22] Filed: Sep. 8, 1994

Related U.S. Application Data

[63] Continuation of Ser. No. 850,952, Mar. 11, 1992, abandoned.

[30] Foreign Application Priority Data

Mar. 14, 1991 [JP] Japan .................. 3-074605

[51] Int. Cl.⁶ .............................................. H04M 7/00
[52] U.S. Cl. ...................... 379/221; 379/387; 370/60
[58] Field of Search ............... 379/161, 168, 221; 370/110.1, 94.1, 94.2, 17, 60, 60.1

[56] References Cited

U.S. PATENT DOCUMENTS

| | | | |
|---|---|---|---|
| 4,611,322 | 9/1986 | Larson et al. | 370/60 |
| 4,862,496 | 8/1989 | Kelly et al. | 379/221 |
| 4,885,686 | 12/1989 | Vanderbei | 379/221 X |
| 4,939,752 | 7/1990 | Literati et al. | 379/221 X |
| 4,975,946 | 12/1990 | Bovo et al. | 379/221 X |
| 5,095,480 | 3/1992 | Fenner | 370/94.1 |

FOREIGN PATENT DOCUMENTS 278156  11/1989  Japan ................... 379/199

*Primary Examiner*—James L. Dwyer
*Assistant Examiner*—Creighton Smith
*Attorney, Agent, or Firm*—Fitzpatrick, Cella, Harper & Scinto

[57] ABSTRACT

A communication terminal apparatus has an interface structure of nB+D (n≧2, B: channel for transfer of user information, D: channel for transfer of control information) and is connected to a digital line network. A reception refusal for m (n≧m) of the n user information transfer channels is registered. When the reception refusal has already been registered, the reception of the user information transfer channels of (n−m+1) or more is refused. Thus, inconvenience from all of the lines being in use for call reception and a new call generation cannot be performed, is prevented.

8 Claims, 8 Drawing Sheets

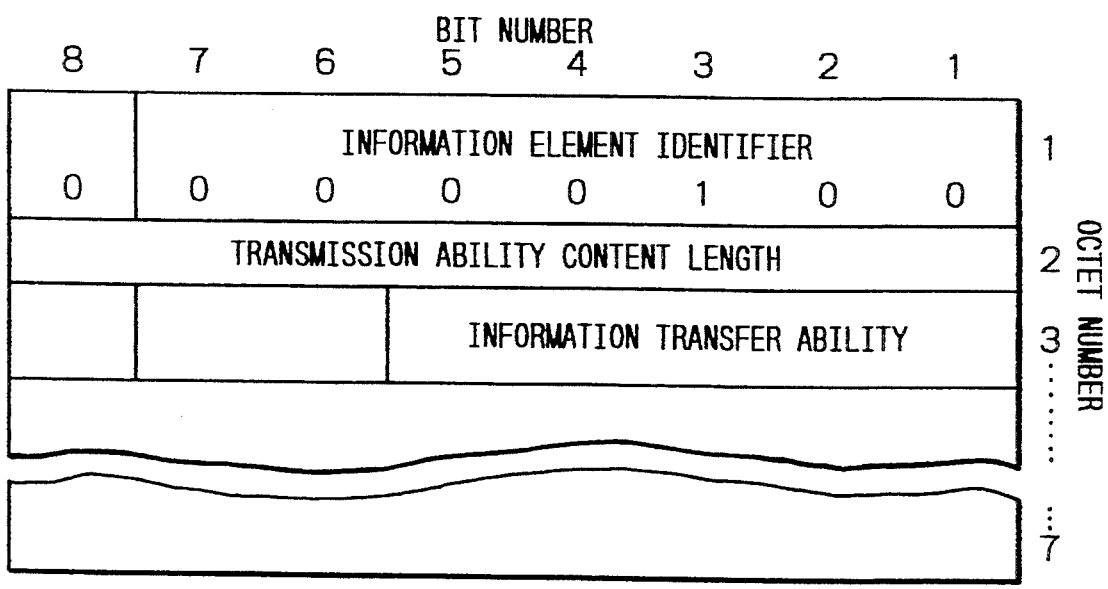

COMMUNICATION TERMINAL APPARATUS

This application is a continuation of application Ser. No. 07/850,952, filed Mar. 11, 1992, now abandoned.

BACKGROUND OF THE INVENTION

1. Field of the Invention

The invention relates to a communication terminal apparatus having compound functions of a G4 facsimile apparatus, a digital telephone, and the like and, more particularly, to a communication terminal apparatus which has an interface structure of nB+D (n≧2, B: channel for transfer of user information, D: channel for transfer of signal information) and which is connected to a digital line network such as an ISDN (Integrated Service Digital Network) or the like.

2. Related Background Art

In recent years, the practical use of communication services by the ISDN has been started and attention is paid to various kinds of communication services using the ISDN. According to the ISDN, the high speed and high quality communication can be realized by using digital lines. It is expected that various communication services and communication terminal apparatuses using the ISDN will be developed and the network society and economy will be further promoted in future.

In the public telephone line network (PSTN) using conventional analog lines or the like, only one channel is provided for one line and, for instance, when a facsimile apparatus is used, the communication line must be used as a dedicated line for the facsimile apparatus or the facsimile apparatus and the telephone must be switched and used. In most such enterprises, the dedicated communication lines for the facsimile apparatus and the dedicated communication lines for the telephones are separately provided.

On the other hand, the ISDN has two user information transfer channels (hereinafter, referred to as "B channels") and one control information transfer channel (hereinafter, referred to as "D channel") even in the case where its interface is a fundamental interface. A communication terminal apparatus having compound functions of a facsimile apparatus and a telephone or other data communication terminal apparatuses or the like or a plurality of apparatuses can be connected to one communication line. The high speed and high quality communication can be peformred as mentioned above. Further, in the data communication such as a facsimile communication or the like, a terminal apparatus having a re-calling function to again automatically call a line even when the line state is busy upon calling has been developed. A situation such that the user is detained is also reduced.

With respect to inventions regarding the ISDN, the assignee of the present invention has already filed U.S. Pat. No. 5,001,709, U.S. patent application Ser. No. 436,254 filed on Nov. 14, 1989, U.S. patent application Ser. No. 450,512 filed on Dec. 14, 1989, U.S. patent application Ser. No. 507,887 filed on Apr. 12, 1990, U.S. patent application Ser. No. 524,493 filed on May 17, 1990, and U.S. patent application Ser. No. 701,026 filed on May 16, 1991.

In the above communication terminal apparatus having the compound function, it is considered that the use frequency of the speech is generally largest and that the number of facsimile communications and other data communications is equal to at most tens of communications per day except in special cases. In general, a non-delay high response speed is not required in the facsimile communication or other data communication but a non-delay response speed is often required for the speech communication.

In the above conventional communication terminal apparatus, however, there is a problem such that when a line state is busy, although there is a terminal apparatus having a re-calling function as mentioned above, there is a case where even for a speech (or communication) which requires an emergency, the person who calls cannot execute a non-delay speech (or communication) for the called side until the busy state is released.

SUMMARY OF THE INVENTION

The invention is made to eliminate the drawbacks of the conventional techniques mentioned above and it is an object of the invention to provide a communication terminal apparatus which can preferentially perform a new call generation by refusing the call reception which uses channels of a predetermined number or more.

According to an aspect of the invention is provided a communication terminal apparatus in which in the case where the number of received B channels is equal to or less than (n−m), the communication can be performed always by using all of the received B channels, and when the refusal of the reception of m B channels has been registered, the reception of the B channels of (n−m+1) or more is refused, so that the m B channels can be assured as call preferential B channels.

Still another object of the invention is to provide a communication terminal apparatus which can release the refusal of the reception after the reception was refused.

Yet another object of the invention is to provide a communication terminal apparatus in which since the number of B channels whose reception can be refused can be selected the number of B channels which are assured as call preferential channels can be made variable.

According to another aspect of the invention is provided a communication terminal apparatus in which by releasing the refusal of the reception by a timer control, even when the reception of B channels of (n−m+1) or more has already been refused by reception refusing means, all of the B channels can be received after the elapse of a predetermined time.

Further another object of the invention is to provide a communication terminal apparatus in which in the case where an information transfer ability of a received call relates to a voice, the call on the calling side can be accepted by receiving means irrespective of the presence or absence of the registration of the reception refusal.

The above and other objects and features of the present invention will become apparent from the following detailed description taken with reference to the accompanying drawings.

BRIEF DESCRIPTION OF THE DRAWINGS

FIG. 9 is a table diagram showing a main section of information elements of a transmission ability;

FIG. 10 is a bit allocation diagram of an information transfer ability; and

DETAILED DESCRIPTION OF THE PREFERRED EMBODIMENTS

An embodiment of the invention will be described in detail hereinbelow with reference to the drawings.

Figure 1:
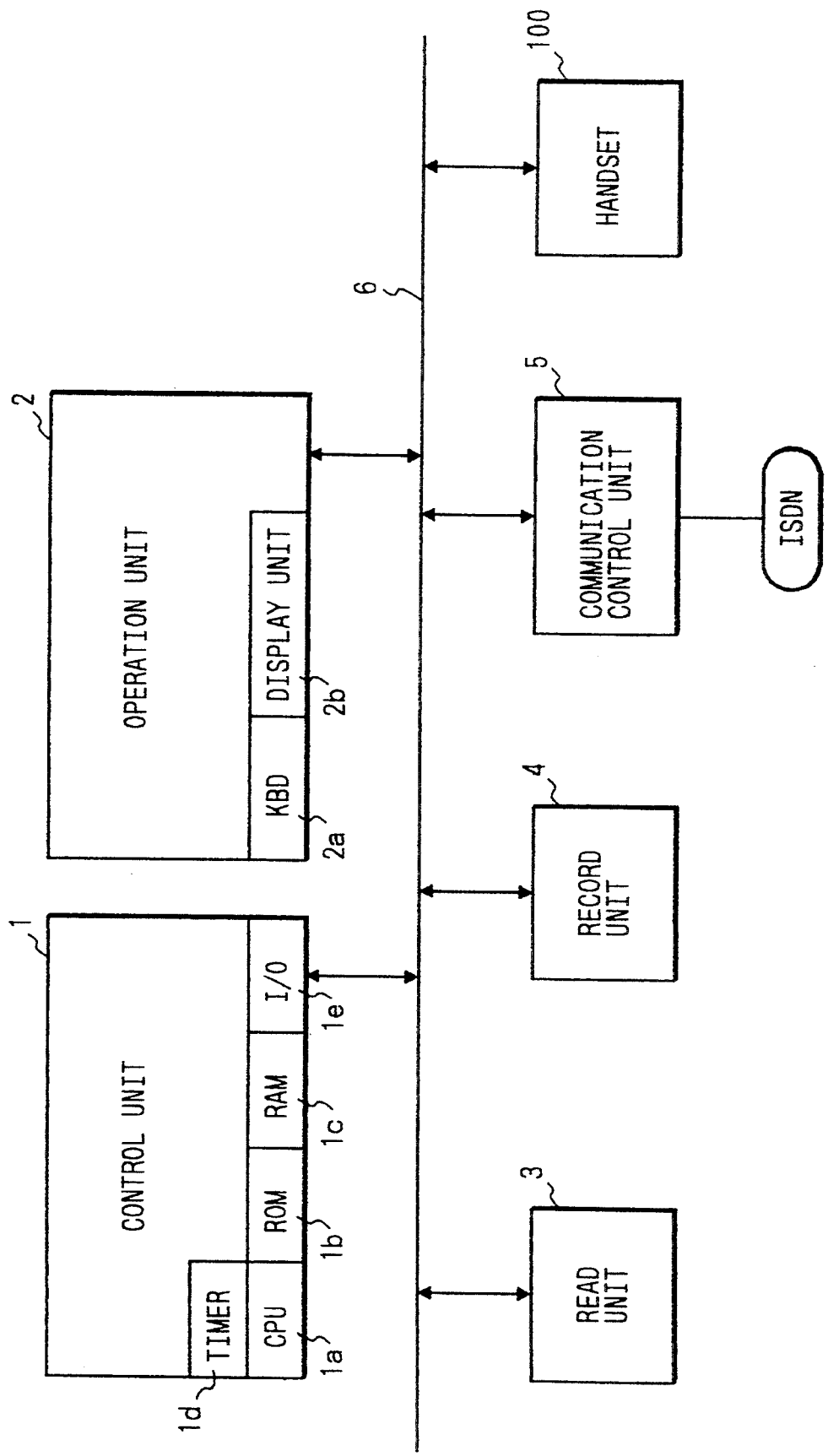
FIG. 1 is a block diagram showing an embodiment of a communication terminal apparatus according to the invention.

FIG. 1 is a block diagram showing an embodiment of a communication terminal apparatus according to the invention.

Reference numeral 1 denotes a control unit comprising a microcomputer circuit. The control unit 1 has a CPU 1a, an ROM 1b, an RAM 1c, a timer 1d, an input-/output circuit (I/O circuit) 1e, and the like. The control unit 1 controls the operation of the whole apparatus and manages various kinds of data by a software control. Reference numeral 2 denotes an operation unit having a keyboard 2a, a display unit 2b, and the like. The operation unit 2 accepts various kinds of key inputs by the user and displays various information. The number of channels of the reception refusal and the selection of the reception refusal are inputted by the keyboard 2a. A read unit 3 has a CCD, an A/D converter, an image processing unit, and the like and optically reads image data and executes image processes such as photoelectric conversion of the image data, A/D conversion, image correction, binarizing process, and the like. Reference numeral 4 denotes a record unit comprising an output apparatus such as thermal printer, laser beam printer, or the like. The record unit 4 generates the image data which has been read by the read unit 3, reception image data, or image data which has been formed by the control unit 1 via a predetermined control procedure. Reference numeral 5 denotes a communication control unit having a coding/decoding section, a line interface section, and the like. The communication control unit 5 controls the transmission and reception of the image data and controls the call generation and call reception of the telephone. In the embodiment, the line interface section has a primary group interface structure of 23B+D. Reference numeral 100 denotes a handset to perform the input and output of a voice.

In the communication terminal apparatus, the control unit 1, operation unit 2, read unit 3, record unit 4, communication control unit 5, and handset 100 are electrically connected through a system bus 6. The above component elements connected to the system bus 6 are controlled by the control uint 1.

The system bus 6 executes the transfer and the like of a control signal to control the above component elements which is generated from the control unit 1 and information signals among the above component elements.

Figure 2:
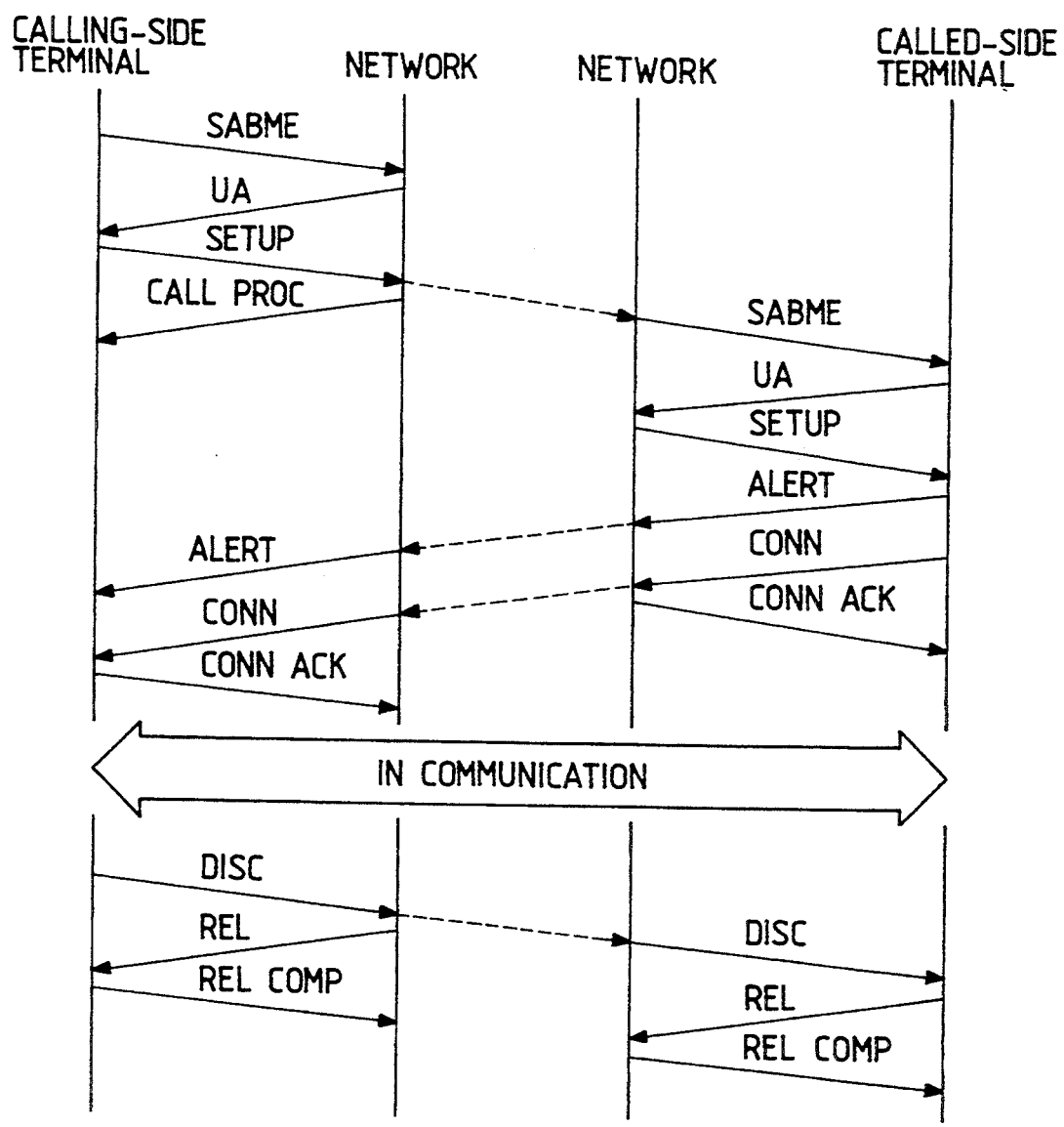
FIG. 2 is a sequence diagram of a D channel control procedure in the ordinary state.

When the communication terminal apparatus with the above construction is connected to the ISDN (hereinafter, simply referred to as a "network"), as shown in FIG. 2, a call is set or released by executing a D channel control procedure between the calling side terminal and the called side terminal.

That is, when a call is set, the calling side terminal firsts transmits an SABME command to a network and activates the setting of an expanding mode to a multiframe link. After that, the calling side terminal receives an UA response (acknowledgment response) to the SABME command from the network. Subsequently, the calling side terminal sends the SETUP message to the network and requests the call setting and receives a CALL PROC message from the network and receives a notification indicating that "a process to set the call is being executed". On the other hand, the network which has received the SETUP message from the calling side terminal sends the SABME command to the called side terminal. The network receives the UA response to the SABME command from the called side terminal and, after that, sends the SETUP message to the called side terminal.

An ALERT message is subsequently transmitted from the called side terminal to the calling side terminal and the calling side terminal receives a notification indicating "the called side terminal is being called". When the called side terminal responds, a CONN message is transmitted from the called side terminal to the calling side terminal through the network and the calling side terminal receives a notification indicating "the called side terminal has responded". The network which has received the CONN message from the called side terminal sends a CONN ACK message (acknowledgment command to CONN) to the called side terminal. The calling side terminal which has received the CONN message from the network transmits the CONN ACK message to the network and enters a communicable state.

On the other hand, when the call is released, the calling side terminal sends a DISC message ("request for call release" message) to the called side terminal through the network. When the calling side terminal receives an REL message (message to request the channel disconnection completion notification and the release of the call number) from the network, the calling side terminal sends an REL COMP message to the network and notifies the channel release and call number release completion to the network, thereby completing the release of the call to the network. On the other hand, when the DISC message is received from the network, the called side terminal also sends the REL message to the network in substantially the same manner as the case of the calling side terminal. The called side terminal subsequently receives the REL COMP message from the network, thereby completing the release of the call to the network.

Figure 3:
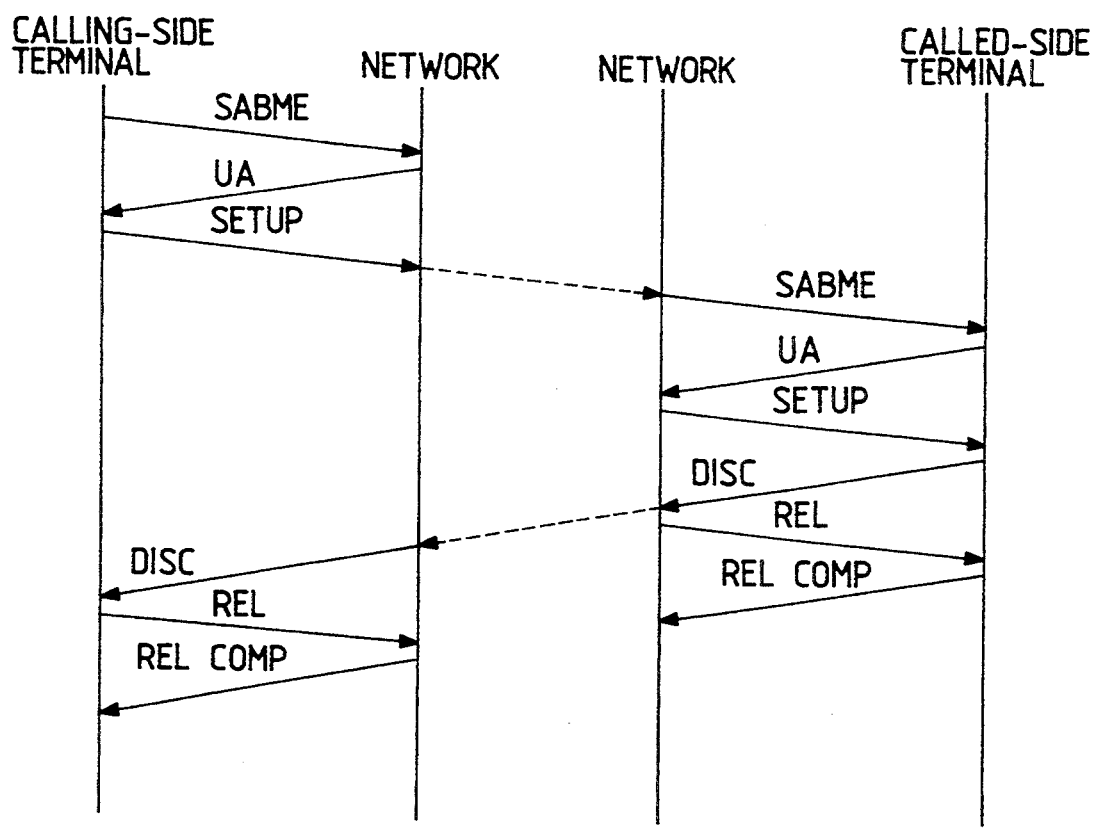
FIG. 3 is a sequence diagram of a D channel control procedure when the reception is refused.

The communication terminal apparatus can perform the communication using 23B channels and can refuse the reception to some of those B channels. In case of refusing the reception, a sequence shown in FIG. 3 is executed by the D channel control procedure.

That is, in a manner similar to FIG. 2, the calling side terminal sends the SABME command to the network and receives the UA response from the network and, thereafter, sends the SETUP message to the network.

On the other hand, after the called side terminal received the SABME command from the network, it sends the UA response to the network and the called side terminal subsequently receives the SETUP message from the network. When the reception is refused, no call is set between the network and the called side terminal and the DISC message is sent from the called side terminal to the calling side terminal through the network. The REL message is sent from the network to the called side terminal. The REL COMP message is sent from the called side terminal to the network. The call between the network and the called side terminal is released. The REL message is sent from the calling side terminal to the network. The calling side terminal receives the REL COMP message from the network and the call between the calling side terminal and the network is released.

The reception refusal sequence is executed on the basis of predetermined registration information stored in the RAM 1c by the input from the keyboard 2a.

Figure 4:
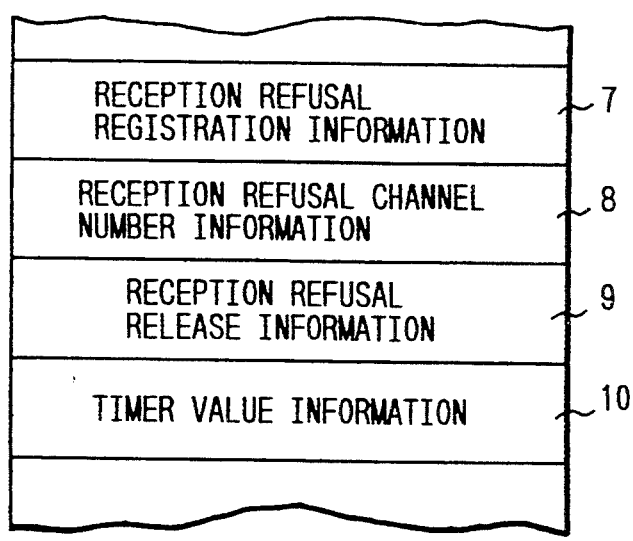
FIG. 4 is a map diagram showing an embodiment of a memory map stored in an RAM.

FIG. 4 shows an example of a memory map into which those registration information are registered and stored. Reception refusal registration information 7, reception refusal channel number information 8, reception refusal release information 9, and timer value information 10 are registered into the storage areas, respectively.

That is, when the reception refusal is executed, bit "1" is written into the storage area of the reception refusal registration information 7. When the reception is not refused, bit "0" is written. By operating the keyboard 2a of the operation unit 2, an arbitrary B channel number m which is equal to or less than n=23 is selected and written into the storage area of the reception refusal channel number information 8. Further, when the reception refusal is released, bit "1" is written into the storage area of the reception refusal release information 9. When the reception refusal is not released, bit "0" is written.

A predetermined count time which is required from the operation of the reception refusing means until the release of the reception refusal is written into the storage area of the timer value information 10. The release of the reception refusal is executed by a method whereby the reception refusal release information 9 is set into bit "1" and the count time set by the timer value information 10 is timed up by the timer 1d.

Figure 5:
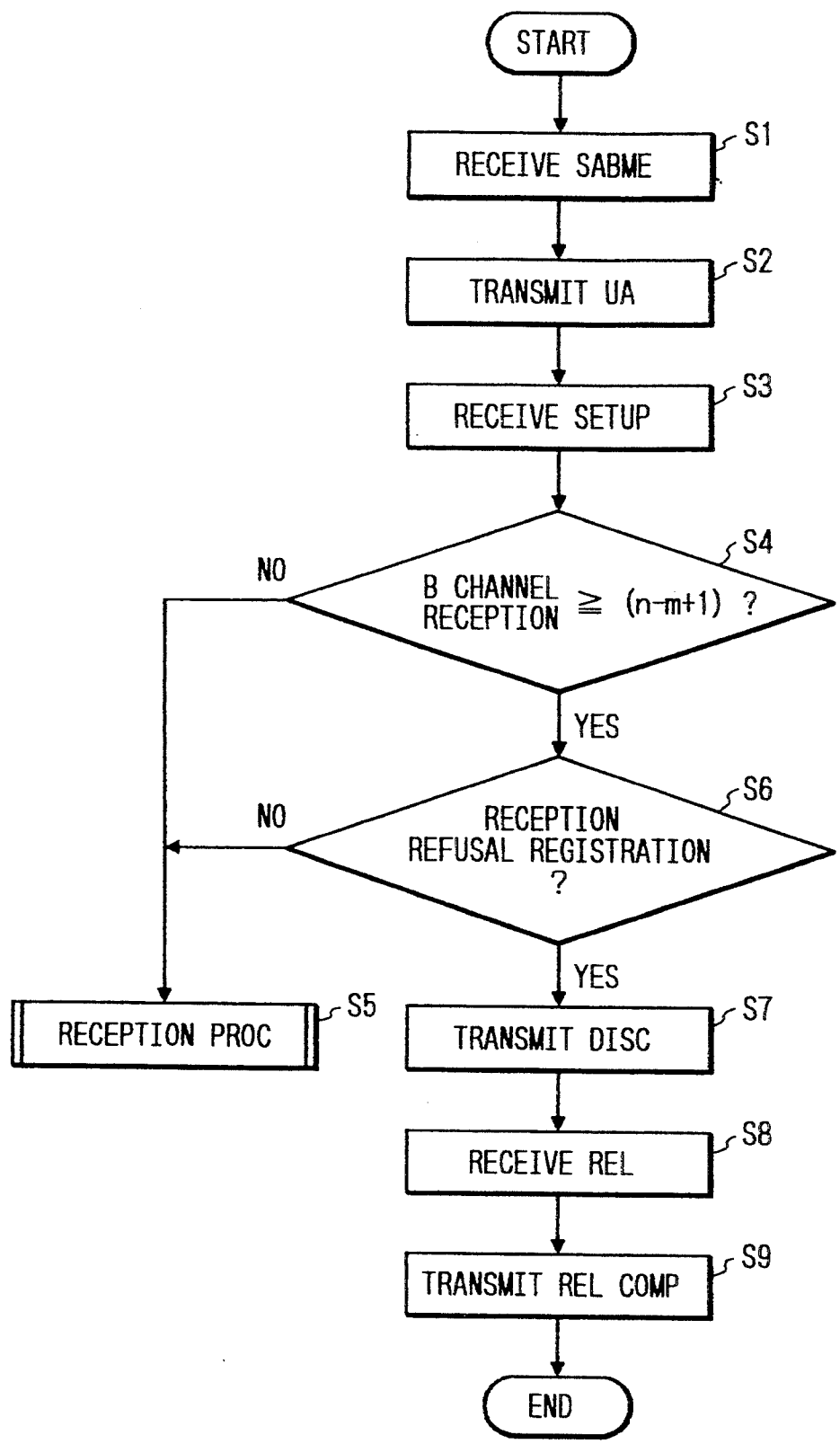
FIG. 5 is a flowchart showing a control procedure for a reception refusal release of the communication terminal apparatus according to the invention.

FIG. 5 is a flowchart showing a control procedure of the communication terminal apparatus upon reception.

The communication terminal apparatus first receives the SABME command from the network (step S1) and, thereafter, sends the UA response to the network (step S2) and subsequently receives the SETUP message from the network (step S3).

The SETUP message is judged to thereby discriminate whether the B channels of (n−m+1) or more have been received by not (step S4).

For instance, when "3" is selected as the reception refusal channel number by the operation of the keyboard 2a of the operation unit 2, m=3 is registered in the reception refusal channel number information 8. In step S4, a check is made to see if the B channels of (n−m+1)=21 or more have been received or not. The number of B channels received is detected.

In the case of the terminal of the embodiment which handles a plurality of B channels, as detecting means, the number of received channels can be easily known by checking the state of the self terminal. When a plurality of terminals are connected to one line via the bus, by monitoring the state of the D channel, the number of B channels which are used by a plurality of terminals of one system can be known.

When the number of received B channels is equal to or less than 20 instead of 21 or more, three reception refusal channels are assured and the sequence for the receiving process is directly executed (step S5). On the other hand, when 21 or more B channels are received in step S4, a check is made to see if the reception refusal has been registered or not, namely, bit "1" has been written into the storage area of the reception refusal registration information 7 or not (step S6). When the reception refusal is not registered and bit "0" is written into the storage area of the reception refusal registration information 7, the sequence of the receiving process is executed. When bit "1" is written in the storage area of the reception refusal registration information 7, the reception is refused and the DISC message is transmitted to the network (step S7). The communication terminal apparatus receives the REL message (step S8) and transmits the REL COMP message, thereby releasing the call (step S9).

In the communication terminal apparatus as mentioned above, the number m of B channels whose reception is refused is registered into the memory map in the RAM 1c and a check is made to see if the B channels are received or not in accordance with the number of B received channels. When the B channels are received, a call setting control procedure shown in FIG. 2 is executed. When the reception is refused, a call releasing control procedure shown in FIG. 3 is executed.

Figure 6:
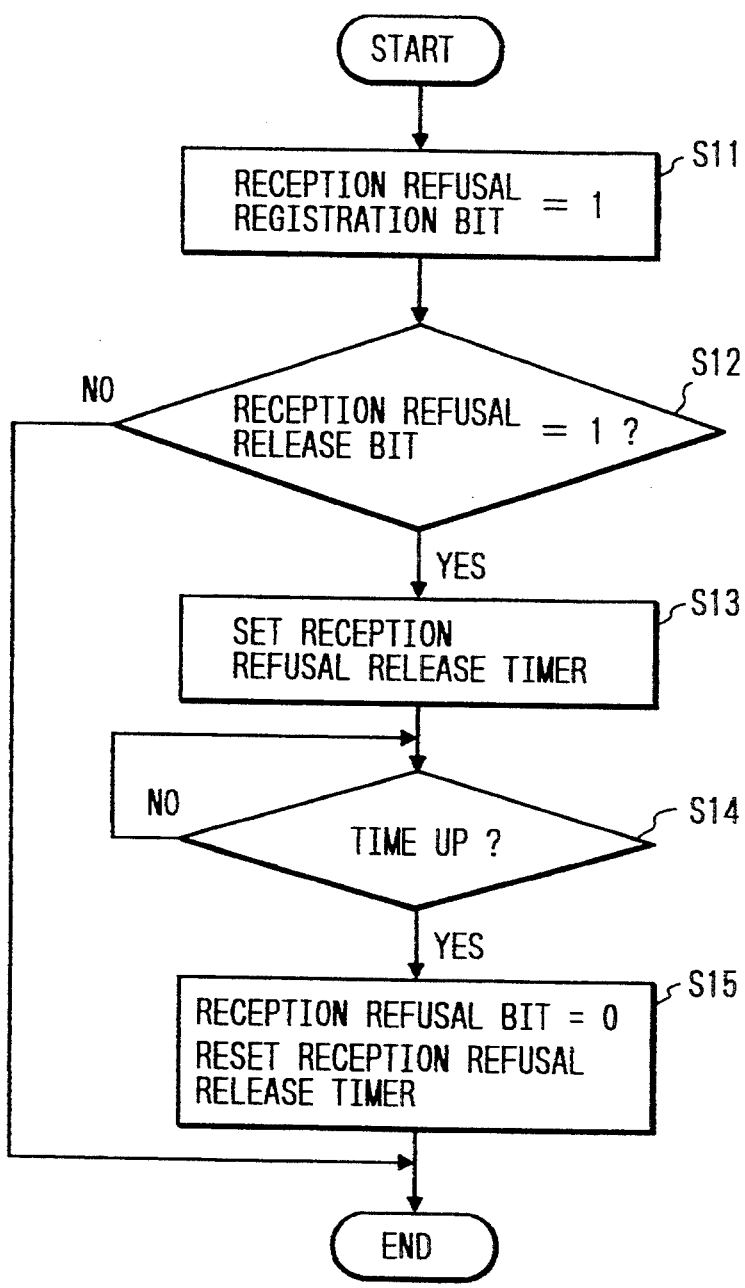
FIG. 6 is a flowchart showing a control procedure for a reception refusal release of the communication terminal apparatus according to the invention.

FIG. 6 is a flowchart showing a control procedure of the releasing means for releasing the reception refuse of the B channels whose reception has been refused.

First, bit "1" is written into the storage area of the reception refusal registration inforamtion 7 as a prerequisite, so that the reception refusing mode is set (step S11). A check is now made to see if the reception refusal release information 9 has been set to bit "1" or not (step S12). When it is not set to bit "1", the reception refusal is not released but the processing routine is finished as it is. On the other hand, when bit "1" is written in the storage area of the reception refusal release information 9, the timer is set (step S13). The counting operation of the timer 1d is started and the apparatus waits for the time-up of the timer 1d (step S14). When the timer 1d is timed up, the reception refusal registration information 9 is rewritten to bit "0", thereby enabling the reception from the partner side terminal to be accepted and resetting the timer 1d of the reception refusal release (step S15). The processing routine is finished.

Figure 7:
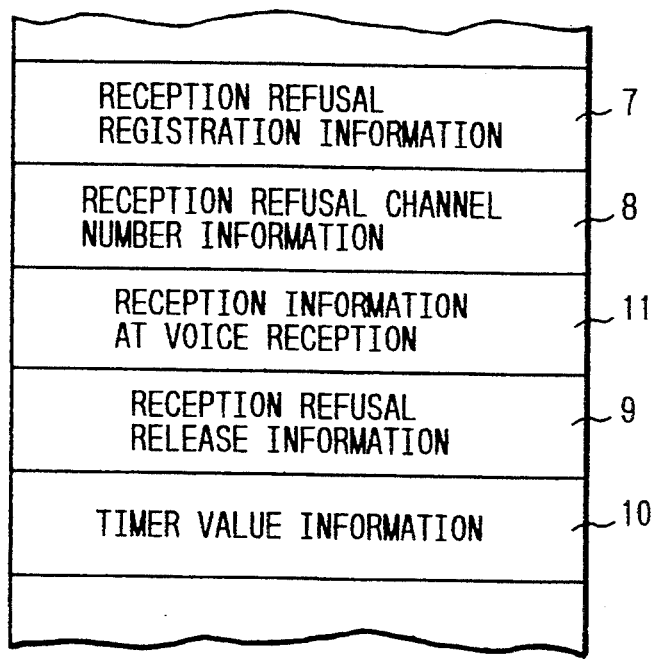
FIG. 7 is a map diagram showing another embodiment of the memory map stored in the RAM.

FIG. 7 shows a memory map of another embodiment. A storage area of reception information 11 at voice reception is provided in the memory map. When the reception information 11 at voice reception is written into bit "1", the reception refusal registration information 7 is set to bit "1", thereby enabling the reception to be performed even when the B channels of (n−m+1) or more have been received.

Whether the received call indicates voice information or not is judged by the information transfer ability of the information elements which is sent together with the received SETUP message.

Figure 8:
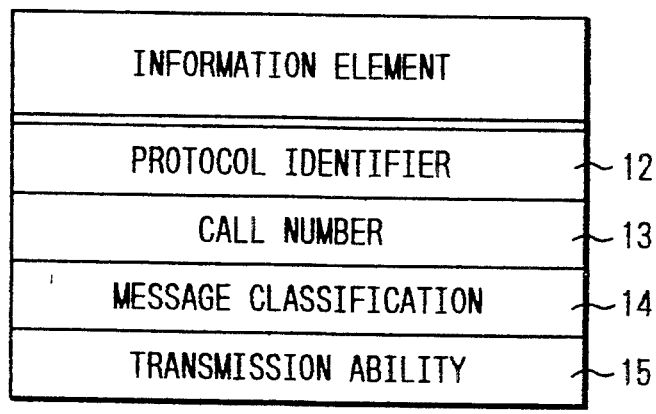
FIG. 8 is a table diagram showing information elements of an SETUP message.

FIG. 8 shows the information elements of the SETUP message.

A protocol identifier 12 notifies the application field of the message. A call number 13 notifies to which call of the B channel the message corresponds. A message classification 14 notifies the call control function of the message. A transmission ability 15 designates the transmission ability which is provided by the network and also notifies the transfer ability to the terminal.

FIG. 9 shows information elements which the transmission ability 15 has. That is, a predetermined information element identifier is stored in an octet number 1. A content length of the transmission ability is stored in an octet number 2. The information transfer ability is stored in bits numbers 1 to 5 of an octet number 3.

Figure 11:
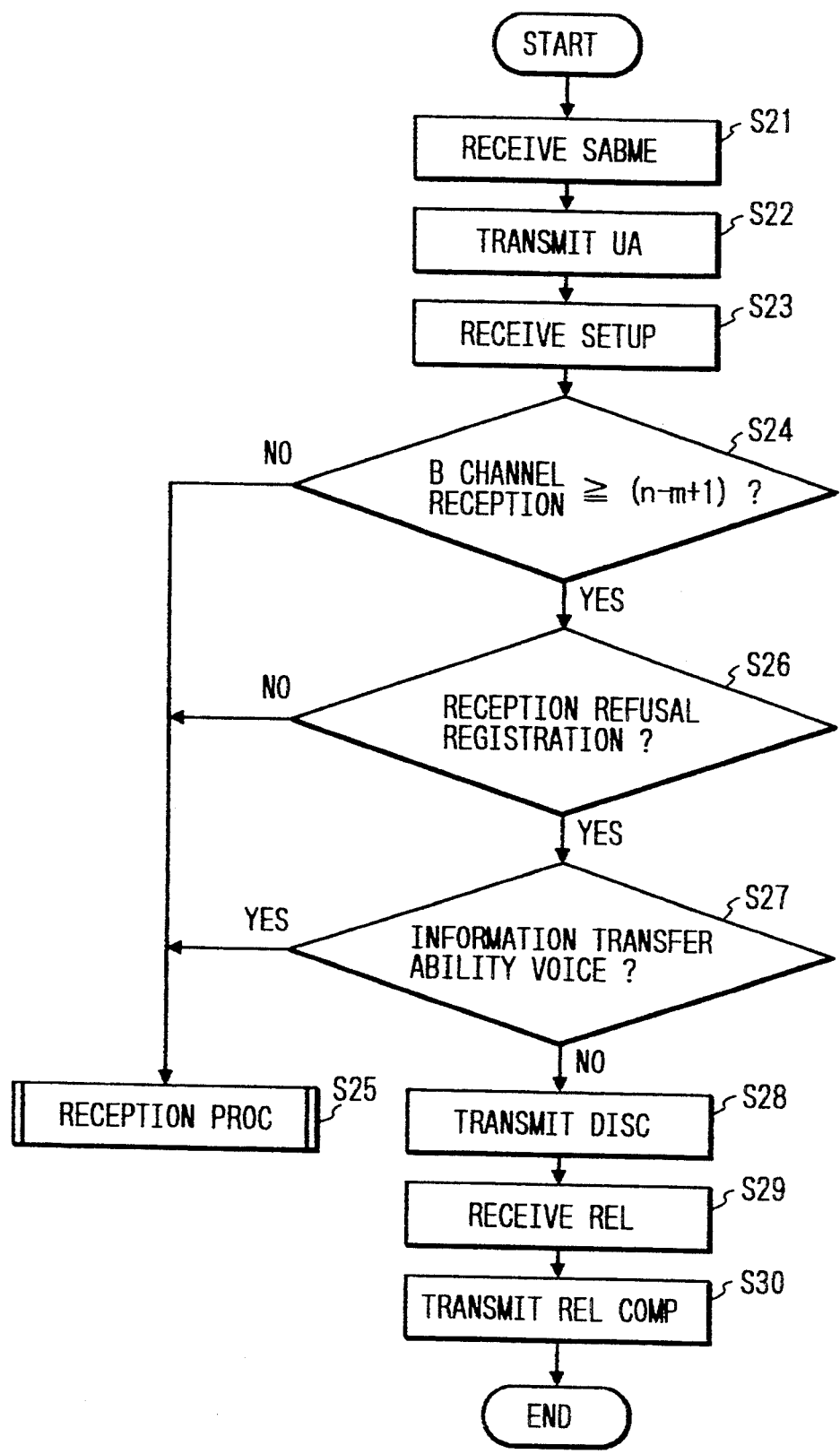
FIG. 11 is a flowchart showing another embodiment of the communication terminal apparatus according to the invention.

As practically shown in FIG. 10, as for the information transfer ability, a bit signal is respectively allocated with respect to voice information, non-limited digital information such as a G4 facsimile or the like, 3.1 kHz audio information, or the like. The information transfer ability is discriminated by the bit signal. When it is determined that the call generated by such a bit signal indicates voice information, namely, when the reception information 11 at voice reception is set to bit "1", a control procedure shown in FIG. 11 is executed.

That is, in a manner similar to the case of FIG. 5, the communication terminal apparatus first receives the SABME command from the network (step S21) and, thereafter, transmits the UA response to the network (step S22) and receives the SETUP message from the network (step S23).

A check is now made to see if the B channels of (n−m+1) or more have been received or not in a manner similar to the foregoing embodiment (step S24). When the number of received B channels is equal to or less than (n−m) instead of (n−m+1) or more, the sequence for the receiving process is executed as it is (step S25).

On the other hand, when the B channels of (n−m+1) or more are received in step S24, a check is made to see if the reception refusal has been registered or not (step S26).

When the reception refusal is not registered, the sequence for the receiving process is executed (step S25). When the reception refusal is not registered, a check is made to see if the information transfer ability indicates the voice or not, namely, the reception information 11 at voice reception has been set to bit "1" or not (step S27). When the information transfer ability doesn't indicate the voice, in a manner similar to the case of FIG. 5, a call releasing procedure such as DISC transmission (step S28)→REL reception (step S29)→REL COMP transmission (step S30) is executed. When the information transfer ability indicates the voice, the sequence for the receiving process is executed (step S25) and the processing routine is finished.

In the case of the voice which is considered such that the information transfer ability requires the non-delay response speed, the speech can be performed without interruption by setting the call irrespective of the number of received B channels or the presence or absence of the reception refusal registration.

The present invention is not limited to the foregoing embodiments but many modifications and variations are possible within the spirit and scope of the appended claims of the invention. Although the above embodiment has been described with respect to the communication terminal apparatus having the interface structure of (23B+D), the invention can be also similarly applied to a primary group interface having an interface structure of (30B+D) or a fundamental interface having an interface structure of (2B+D).

As described in detail above, according to the invention, the communication terminal apparatus which has the interface structure of (nB+D) and is connected to the digital line network comprises: the detecting means for detecting the number of received B channels; the registering means for registering the reception refusal for the m (n≧m) B channels among n B channels; and the reception refusing means for refusing the reception of the B channels of (n−m+1) or more in the case where the reception refusal has been registered by the registering means. Thus, the m B channels can be used in a call generation preferential manner and a situation such that the communication having a non-delay response speed such as a speech or the like is obstructed is reduced.

Moreover, by releasing the reception refusing state by the releasing means, a communication path is set to all of the B channels to be received, and it is possible to perform the communication using all of the received B channels.

On the other hand, since the invention has the selecting means for selecting the number of B channels whose reception is refused which has been registered by the registering means, a situation such that the use efficiency of the B channels is one-sided to the calling side can be prevented.

Further, according to the invention, since the releasing means releases the reception refusal by the timer control, even when a call generation preferential state is given to the calling side, such a state can be released after the elapse of a predetermined time.

On the other hand, since the invention has the receiving means for receiving in the case where the information transfer ability of the received call indicates a voice even when the reception refusal has been registered by the registering means, a situation such that the reception call is refused to the speech which requires a non-delay response speed is also eliminated.

In the communication terminal apparatus according to the invention mentioned above, a communication which requires a non-delay response speed can be preferentially communicated.

Although the present invention has been described with respect to the preferred embodiments, the invention is not limited to the foregoing embodiments but many modifications and variations are possible within the spirit and scope of the appended claims of the invention.

What is claimed is:

1. A communication terminal apparatus connected to a communication network having a plurality of communication channels, said apparatus adapted to receive a plurality of calls, each call occupying one or more of the channels, said apparatus comprising:
    registering means for registering m (n≧m) of the n channels as reception refusable channels;
    first detecting means for detecting an incoming call set to occupy one or more of the channels on the communication network;
    second detecting means for detecting, in response to detection of an incoming call by said first detecting means, a number of the channels currently occupied;
    reception refusing means for refusing reception of the incoming call when the detected number of the channels currently occupied is greater than or equal to (n−m+1);

timer means connected to said reception refusing means for timing a period to provide a time value; and releasing means for, in response to the time value, releasing operation of said reception refusing means to allow reception of an incoming call.

2. An apparatus according to claim 1, further comprising selecting means for selecting the number m of channels as reception refusable channels.

3. An apparatus according to claim 1, wherein said releasing means releases the operation of said reception refusing means after the time value indicates a lapse of a predetermined time following refusal of reception of the incoming call.

4. A communication terminal apparatus connected to a communication network having a plurality of communication channels, said apparatus adapted to receive a plurality of calls, each call occupying one or more of the channels, said apparatus comprising:

registering means for registering m (n≧m) of the n channels as reception refusable channels;

first detecting means for detecting an incoming call set to occupy one or more of the channels on the communication network;

discriminating means for discriminating whether the incoming call includes a voice signal;

second detecting means for detecting, in response to detection of the incoming call by the first detecting means, a number of the channels currently occupied; and reception refusing means for refusing reception of the incoming call when the detected number of the channels currently occupied is greater than or equal to (n−m+1), wherein said reception refusing means permits reception of the incoming call regardless of whether the detected number of channels currently occupied is greater than or equal to (n−m+1) when said discrimination means discriminates that the incoming call includes a voice signal.

5. A method of operating a communication terminal apparatus connected to a communication network having a plurality of communication channels, the apparatus adapted to receive a plurality of calls, each call occupying one or more of the channels, said method comprising the steps of:

registering m (n≧m) of the n channels as reception refusable channels;

detecting an incoming call set to occupy one or more of the channels on the communication network;

detecting, in response to detection of an incoming call, a number of the channels currently occupied;

refusing reception of the incoming call when the detected number of the channels currently occupied is greater than or equal to (n−m+1);

timing a period in connection with refusal of reception of the incoming call to provide a time value; and releasing, in response to the time value, operation of said reception refusing step to allow reception of the incoming call.

6. A method according to claim 5, further comprising a step of selecting the number m of channels as reception refusable channels.

7. A method according to claim 5, wherein said releasing step releases the operation of said refusing step after the time value indicates a lapse of a predetermined time following refusal of reception of the incoming call.

8. A method of operating a communication terminal apparatus connected to a communication network having a plurality of communication channels, the apparatus adapted to receive a plurality of calls, each call occupying one or more of the channels, said method comprising the steps of:

registering m (n≧m) of the n channels as reception refusable channels;

detecting an incoming call set to occupy one or more of the channels on the communication network;

discriminating whether the incoming call includes a voice signal;

detecting, in response to detection of an incoming call, a number of the channels currently occupied; and refusing reception of the incoming call when the detected number of the channels currently occupied is greater than or equal to (n−m+1) wherein said refusing step permits reception of the incoming call regardless of whether the detected number of the channels currently occupied is greater than or equal to (n−m+1) when said discriminating step discriminates that the incoming call includes a voice signal.

* * * * *